United States Patent

[11] 3,602,647

[72] Inventors Masao Kawashima
Yokohama-shi;
Shigehiko Hinoshita, Yokohama-shi;
Tsukumo Higeta, Kawasaki-shi, all of, Japan

[21] Appl. No. 767,996
[22] Filed Oct. 16, 1968
[45] Patented Aug. 31, 1971
[73] Assignee Fujitsu Limited
Kawasaki, Japan
[32] Priority Feb. 6, 1962
[33] Japan
[31] 37/4594
Continuation-in-part of application Ser. No. 255,429, Feb. 1, 1963, now abandoned.

[54] CONTROL SIGNAL TRANSMISSION IN TIME DIVISION MULTIPLEX SYSTEM COMMUNICATIONS
5 Claims, 12 Drawing Figs.

[52] U.S. Cl. .......... 179/15 BS, 179/15 BW
[51] Int. Cl. .......... H04j 3/06
[50] Field of Search .......... 179/15 BS, 15 BA, 15 AQ, 15 BY, 15 A

[56] References Cited
UNITED STATES PATENTS

| | | | |
|---|---|---|---|
| 2,629,771 | 2/1953 | Anderson et al. | 179/15.55 R |
| 3,310,779 | 3/1967 | Wagner | 179/15 BA |
| 3,136,861 | 6/1964 | Mayo | 179/15 (ASYNC) |
| 3,236,951 | 2/1966 | Yamamoto et al. | 179/15 (ATI) |
| 3,261,922 | 7/1966 | Edson et al. | 179/15 (SIG) |
| 3,312,783 | 4/1967 | Martin et al. | 179/15 (ASYNC) |
| 3,387,086 | 6/1968 | Beresin | 179/15 (ASYNC) |
| 3,482,048 | 12/1969 | Takada et al. | 179/15 (SIG) |

FOREIGN PATENTS

| | | | |
|---|---|---|---|
| 945,406 | 12/1963 | Great Britain | 179/15 (SIG) |

*Primary Examiner*—Kathleen H. Claffy
*Assistant Examiner*—David L. Stewart
*Attorneys*—Curt M. Avery, Arthur E. Wilfond, Herbert L. Lerner and Daniel J. Tick

ABSTRACT: In a control signal transmission system of a time division multiplex system a plurality of series pulse code modulation trains including binary data bits and ringing bits or signalling bits are provided in parallel. A single series pulse code modulation train is derived and is comprised exclusively of ringing bits. In the single series pulse code modulation train, the minimum number of ringing bits required for transmitting ringing information in a unit time is maintained. The remaining bits of the single series pulse code modulation train are replaced with synchronizing signals.

PATENTED AUG 31 1971 3,602,647

SHEET 6 OF 7

CONTROL SIGNAL TRANSMISSION IN TIME DIVISION MULTIPLEX SYSTEM COMMUNICATIONS

Figure 1:
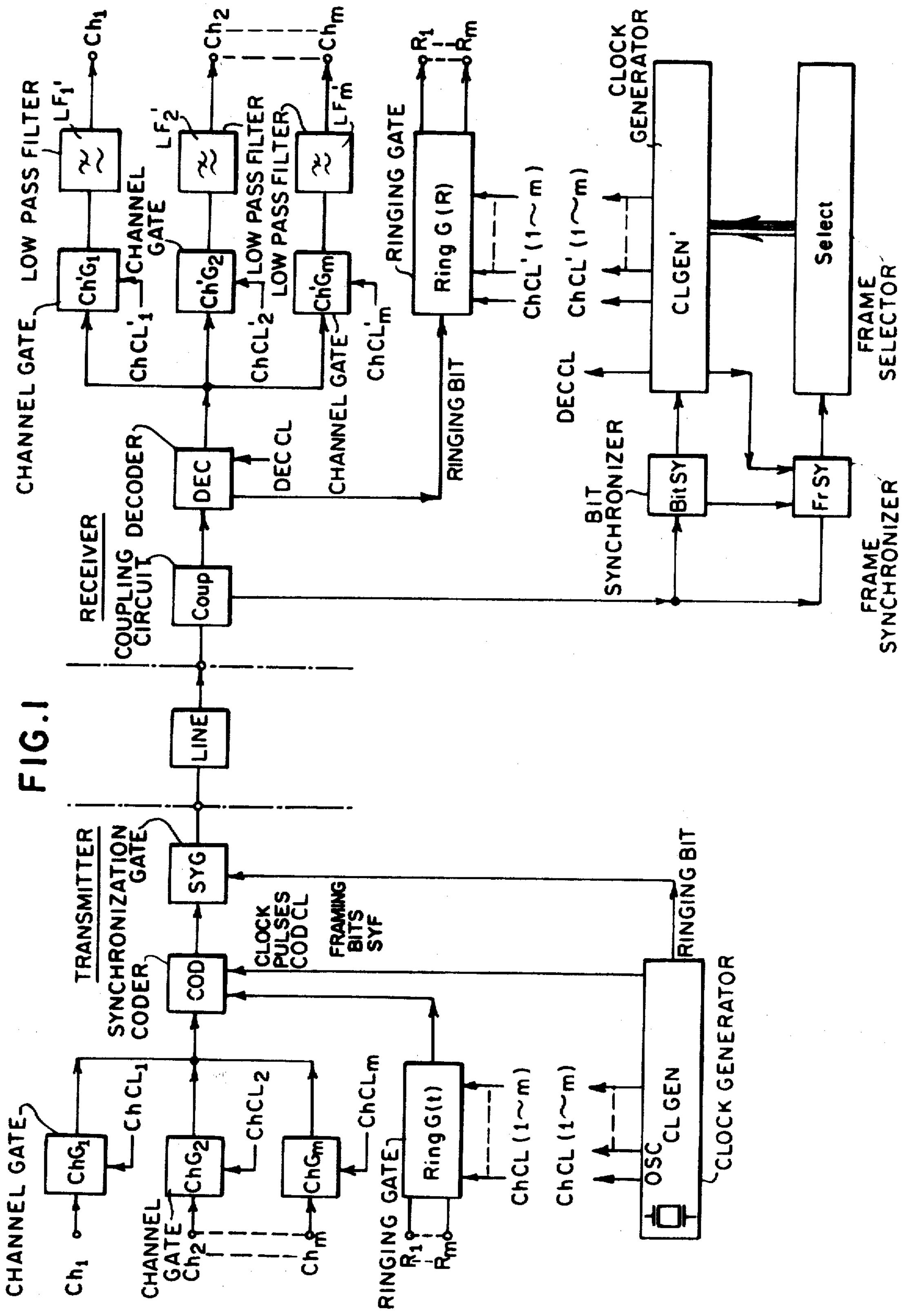

The present application is a continuation-in-part of application Ser. No. 255,429, filed Feb. 1, 1963 now abandoned and assigned to the same assignee.

DESCRIPTION OF THE INVENTION

This invention relates to a time division multiplex PCM transmission system and particularly to a time division multiplex PCM transmission system used in telephone transmission.

In a time division multiplex PCM system, it is necessary to increase the degree of multiplicity in order to reduce the cost per one communication channel, hereinafter referred to as the channel. However, if the degree of multiplicity is increased in a system for performing time division multiplex PCM transmission (hereinafter referred to as the time division series multiplex PCM transmission system) using a single line, it becomes necessary to raise the speed of operation of a coder and other devices required in said system and also the frequency band of the signals transmitted through the line is expanded. In order to raise the speed of operation of the coder and other devices, it is necessary to use expensive elements and complicated circuits in the devices and this will make the transmitter and receiver expensive. Also, if the frequency band is expanded, it becomes necessary to use a transmission line of a high quality and shorten the space between regenerative repeaters and increase the number of the regenerative repeaters, and these make the system more expensive.

The degree of multiplicity can also be increased by transmitting signals by the use of a plurality of lines, and this method is referred to as the space division multiplex. In order to increase the degree of multiplicity by this method, it is necessary to increase the number of lines and accordingly this method cannot greatly contribute to the reduction of cost per one channel.

This invention relates to a PCM transmission system which is a combination of the time division multiplex and the space division multiplex described above and provides a system which is a simple combination of said two systems. This invention can be roughly divided into three systems and the characteristic features of these systems can be briefly described as follows. The first system involves the insertion of synchronizing signals into spaces formed in the time slot of the space channel comprising ringing bits in the parallel system. The second system involves the insertion of two sets of series PCM signals in a time slot of one bit in the form of an NRZ code. An NRZ code is a nonreturn to zero code. The third system is the utilization of a method of transmitting one bit in a time slot of one bit by NRZ codes, by which the required transmission band may be halved. The first system can obtain a more stable synchronism than the conventional system. The second system can obtain a degree of multiplication equal to a multiple of that of the conventional system. The third system requires a transmission band equal to only half that of the conventional system.

The principal object of the present invention is to provide a new and improved time division multiplex PCM transmission system.

An object of the present invention is to provide a time division multiplex PCM transmission system which avoids the disadvantages of known systems.

An object of the present invention is to provide a time division multiplex PCM transmission system which avoids the disadvantages of known systems.

An object of the present invention is to provide a time division multiplex PCM transmission system which provides more stable and certain synchronization than known systems.

In accordance with the present invention, in a time division multiplex system, a control signal transmission system comprises code means for providing in parallel a plurality of series pulse code modulation trains including binary data bits and ringing bits on signalling bits. A code converter connected to the code means converts the pulse code modulation trains to series form. A circuit connected to the code converter derives a single series pulse code modulation train exclusively of ringing bits or signalling bits and maintains in the single series pulse code modulation train the minimum number of ringing bits required for transmitting ringing information in a unit time. An output connected to the circuit replaces the remaining bits of the single series pulse code modulation train with control signals and transmits the pulse code modulation trains in parallel. The control signals are synchronizing signals.

The code means may divide the series pulse code modulation trains in two groups of parallel pulse code modulation trains to provide twice the multiplexity provided by a single pulse code modulation train in the same transmission frequency band. Each of the bits is in a bit time slot and the two groups of parallel pulse code modulation trains are provided in the same bit time slots. Each parallel pulse code modulation train may comprise a single parallel pulse code modulation train provided in full bit time slots to provide the same multiplexity as the time division multiplex system in half the transmission frequency band thereof. Full bit time slots are those which utilize all the time slots as pulse receivers.

In accordance with the present invention, a method of control signal transmission in time division multiplex system comprises providing a series pulse code modulation train including binary data bits and ringing bits in parallel. The series pulse code modulation trains are converted to series form. A single series pulse code modulation train exclusively of ringing bits is derived from the series pulse code modulation trains. The minimum number of ringing bits required for ringing transmitting is maintained in the single series pulse code modulation train. The remaining bits of the single series pulse code modulation train are replaced with control signals. The control signals are synchronizing signals.

The method of the present invention may include the step of providing the series pulse code modulation trains in two groups of parallel pulse code modulation trains to provide twice the multiplicity provided by a single parallel pulse code modulation train in the same transmission frequency band. Each of the bits is a bit time slot and the two groups of parallel pulse code modulation trains are provided in the same bit time slots. The parallel pulse code modulation trains may comprise a single parallel pulse code modulation train provided in full bit time slots to provide the same multiplicity as the time division multiplex system in half the transmission frequency band thereof.

Figure 2A:
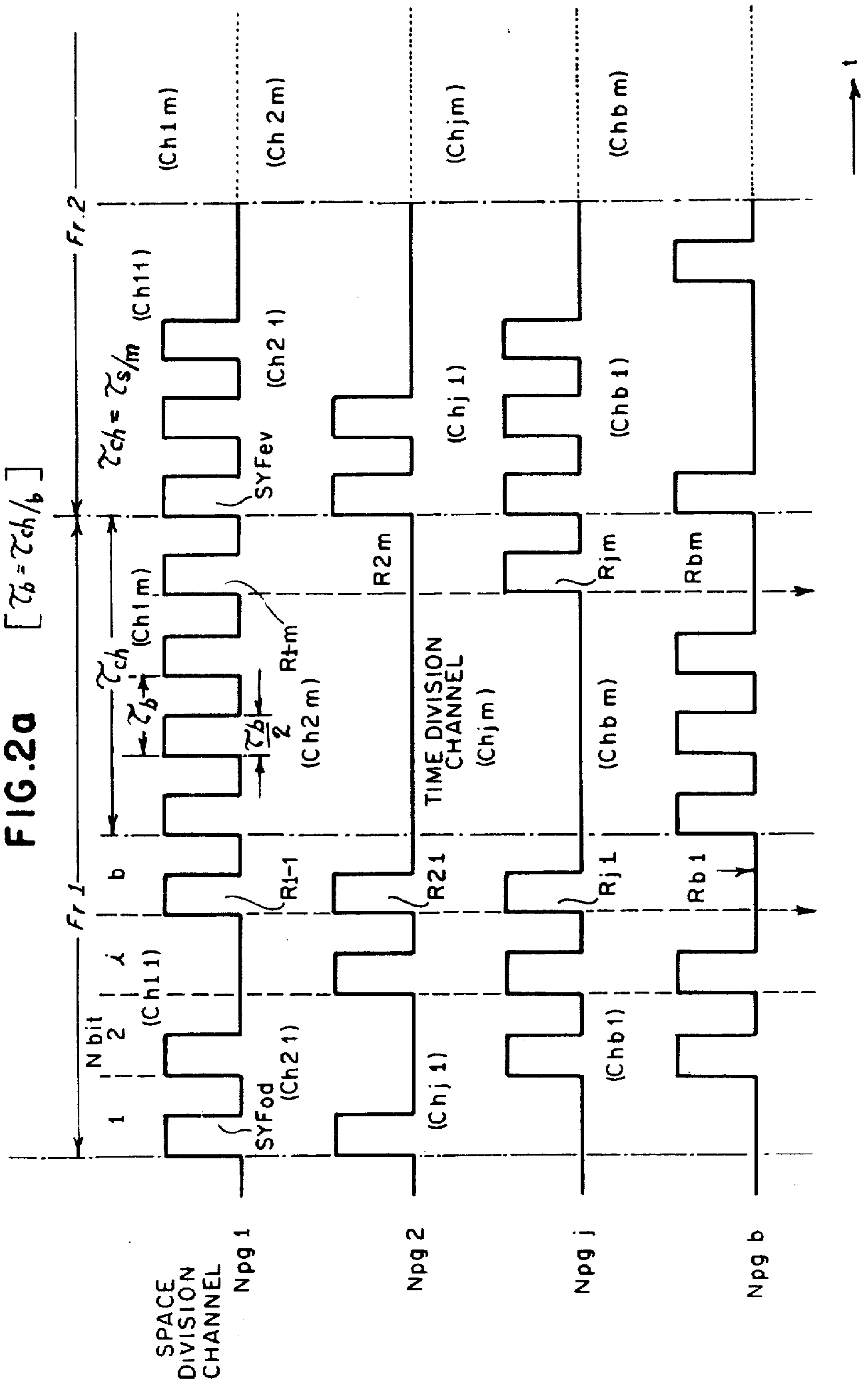
Figure 2B:
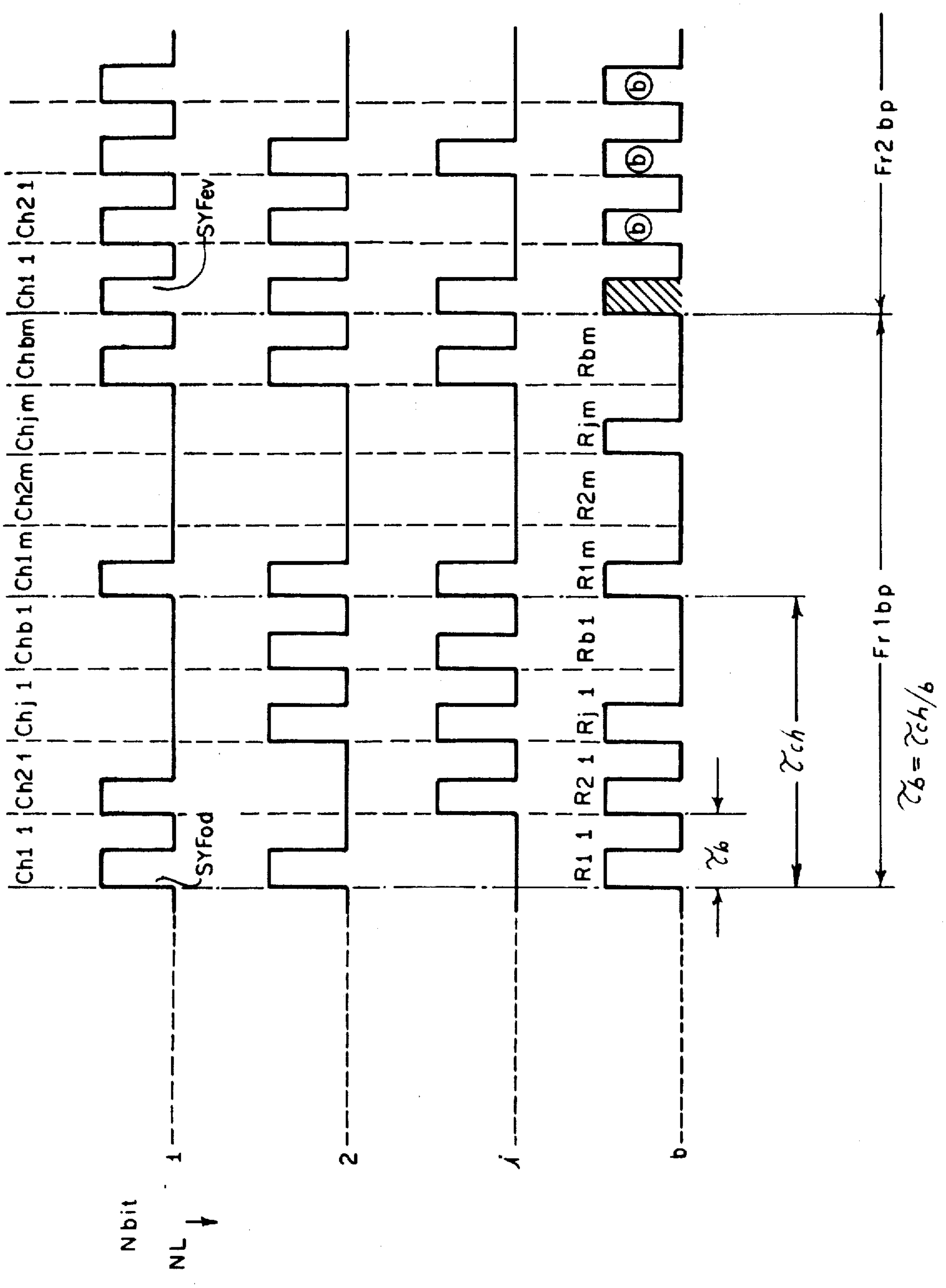
Figures 2C, 2D:
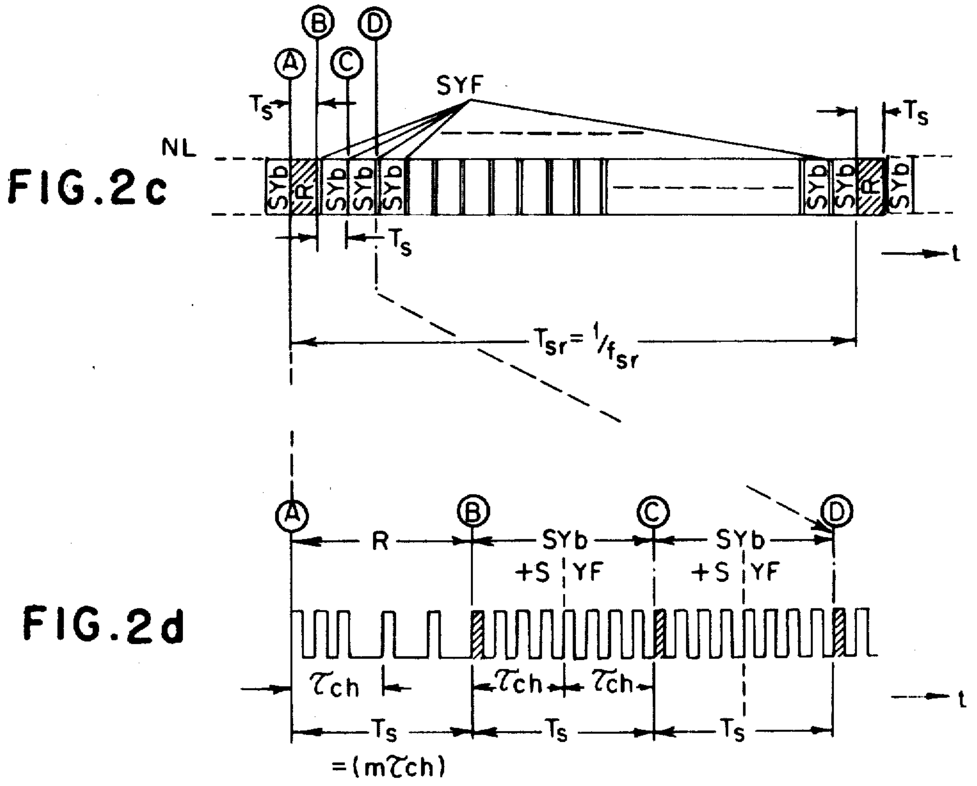
Figure 2E:
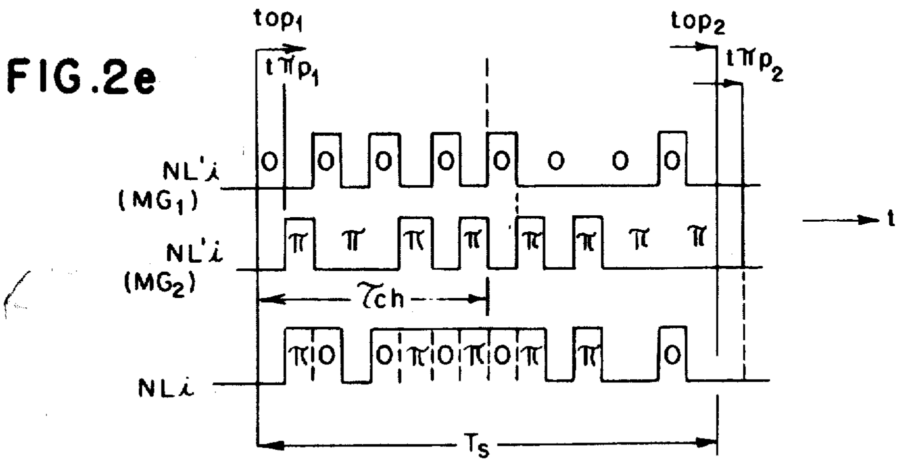
Figures 3A, 3B:
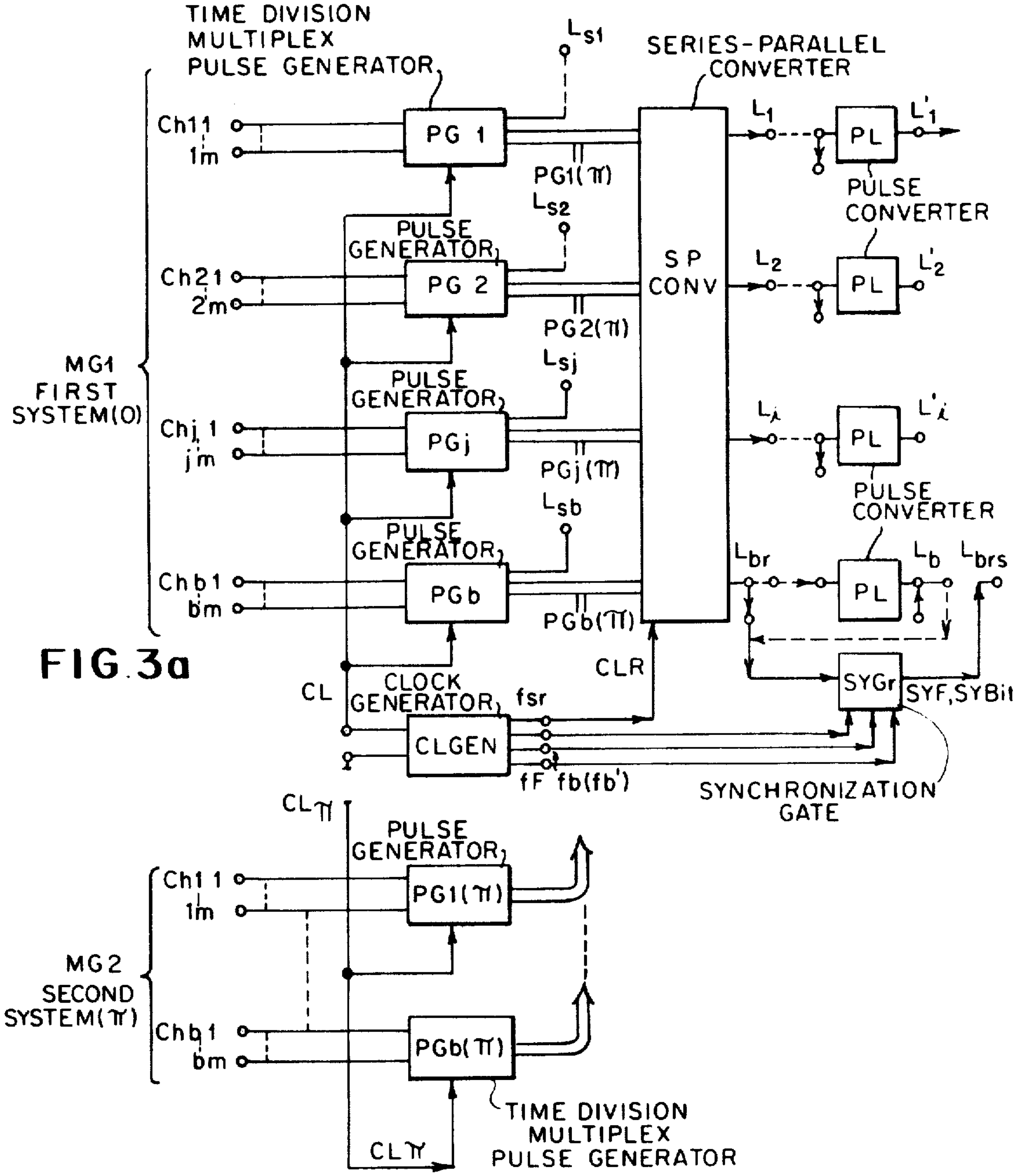
Figure 4A:
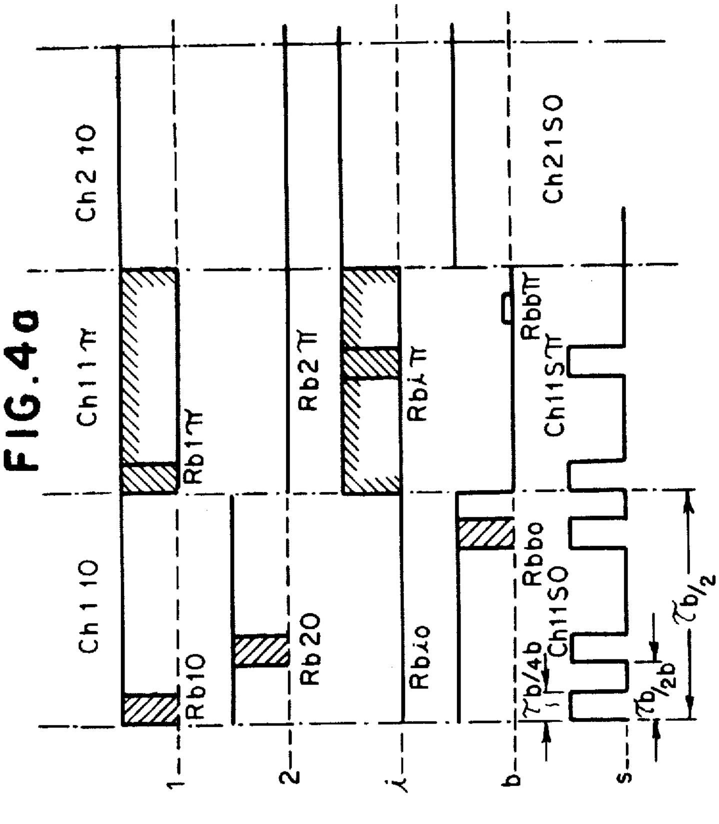
Figure 4B:
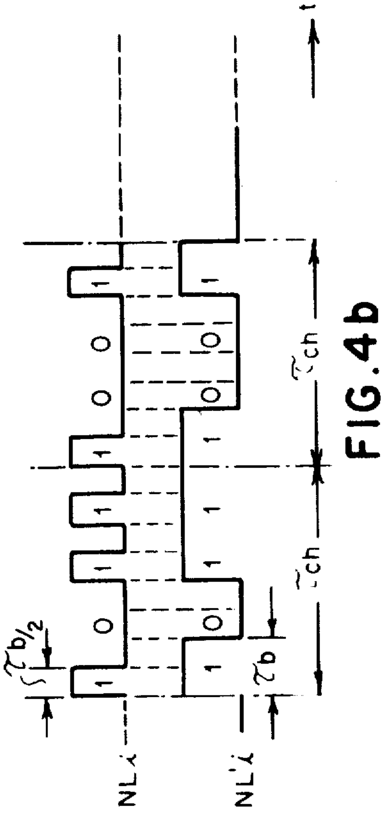
Figure 3C:
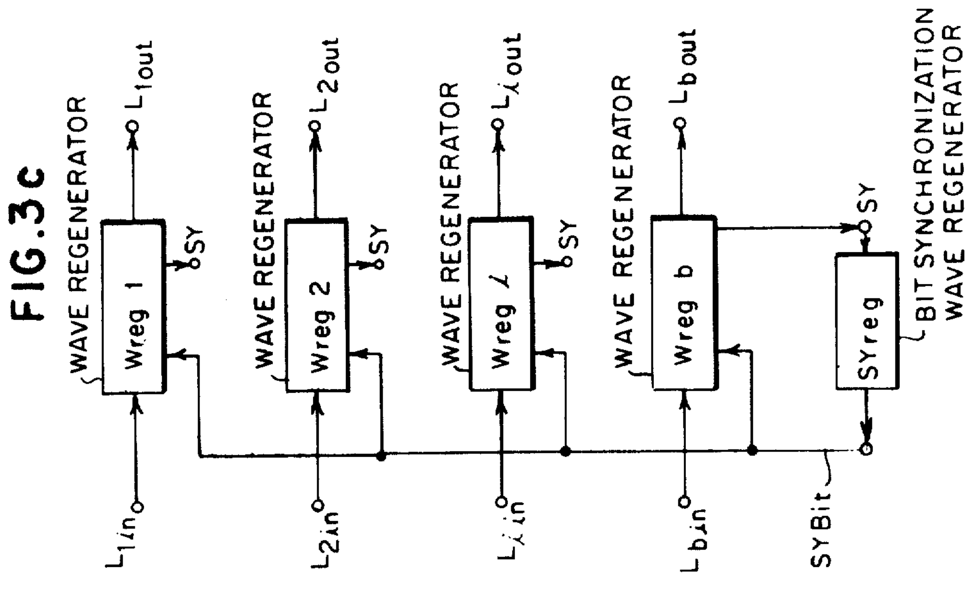
Figure 5:
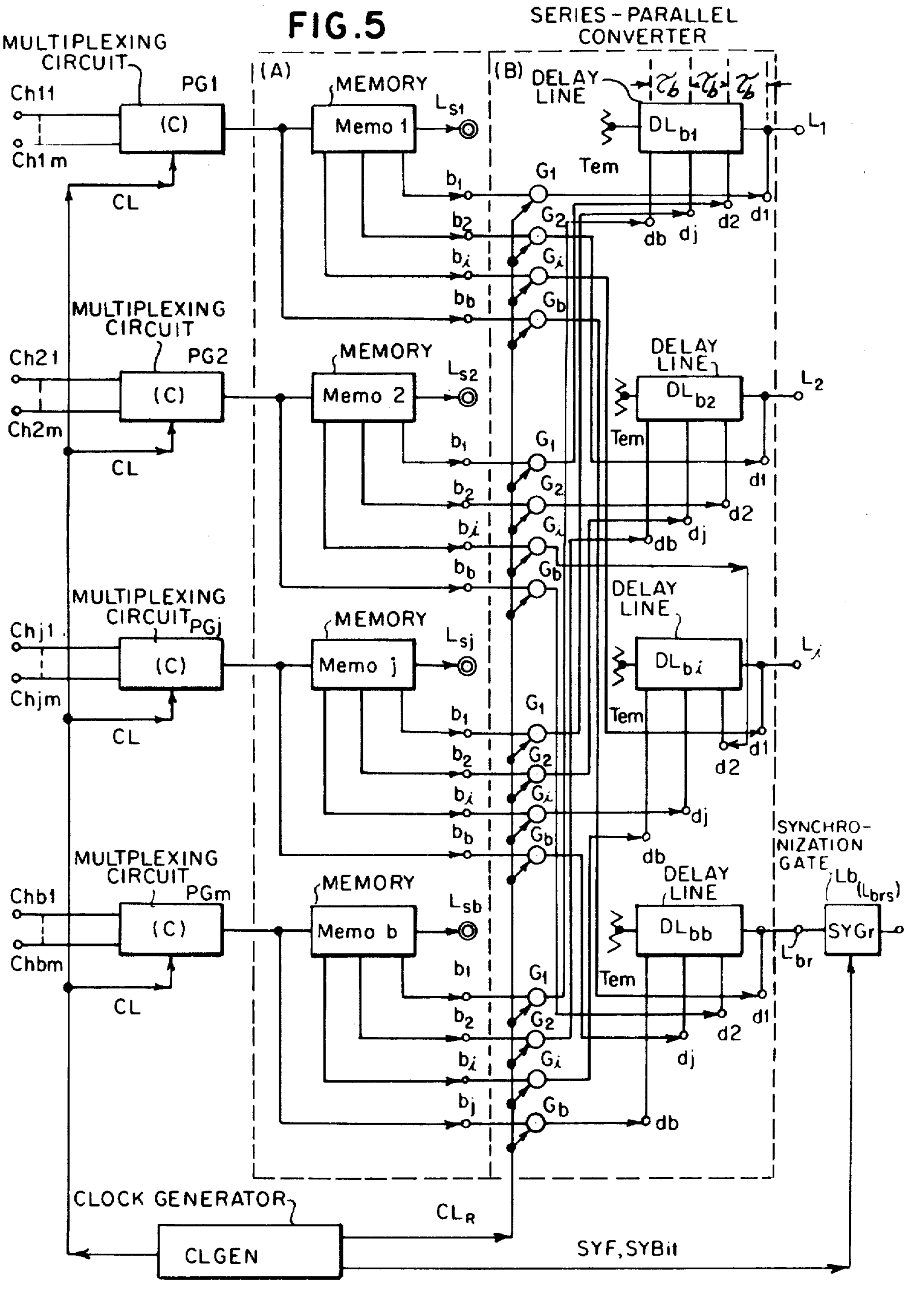

In order that the present invention may be readily carried into effect, it will now be described with reference to the accompanying drawings, wherein:

FIG. 1 is a block diagram of a known embodiment of a time division multiplex PCM communication system;

FIG. 2*a* is a graphical presentation of serial PCM code trains before serial to parallel conversion;

FIG. 2*b* is a graphical presentation of serial PCM code trains after serial to parallel conversion;

FIGS. 2*c* and 2*d* are graphical presentations of an embodiment of the synchronizing signals of the system of the present invention FIG. 2*e* is a graphical presentation of the combination of PCM code trains;

FIG. 3*a* is a block diagram of an embodiment of the transmission converting device of the system of the present invention;

FIG. 3*b* is a block diagram of another embodiment of the transmission converting device of the system of the present invention;

FIG. 3*c* is a block diagram of an embodiment of a regenerative repeater of the system of the present invention;

FIG. 4*a* is a graphical presentation of the operation of the first-mentioned invention of the present invention;

FIG. 4*b* is a graphical presentation of the reduction of the transmission band to one half; and FIG. 5 is a block diagram of an embodiment of a series-parallel converter which may be utilized as the series-parallel converter of FIG. 3*a*.

In a conventional PCM transmission system, synchronization pulses are transmitted in an external channel. In the present invention, synchronization pulses are transmitted in spaces created in the ringing channel by the deletion of redundant pulses.

A conventional PCM transmission system is described with reference to FIG. 1. On the transmitting side, call signals of the channels designated by $Ch_1$, $Ch_2$——$Ch_{24}$ are sampled by channel clock pulses $ChCL_1$ ——$ChCl_{24}$ in channel gates $ChG_1$ ——$_{ChG24}$ of the corresponding channels and the call signals are changed into PAM pulses. These PAM pulses are applied to a coder COD in the order of arrangement of the channels. The coder COD is supplied with the required clock pulses CODCL and converts the PAM pulses into binary PCM codes in the order of the channels.

It is necessary to transmit ringing signals used as dial signals or for exchange controlling and selecting signals simultaneously. The ringing signals are DC codes interrupted at about ten to scores of cycles and are time division multiplex sampled by channel clocks for call signals in a ringing gate Ring G ($t$) and are further coded and are added to binary PCM codes as ringing codes of one bit.

Thus, one frame is constituted by multiplying 1 to $m$ or 1 to 24 channels each comprising a call code bit and a ringing bit. Incidentally, in the case of FIG. 1, the first bit showing the lowest column of the first channel of each frame is removed from the call bit and the framing signal is inserted. That is, for example, framing signals SYF comprising frames of odd degree SYF*od* and frames of even degree SYF*ev*, which are alternatively switched ON and OFF, are inserted.

In FIG. 1, the framing signal SYF is derived from a clock generator CL GEN and is inserted as the framing signal bit, as described above, by a synchronizing gate SYG. Such frames are supplied to the transmission line successively. Ordinarily synchronization between bits of the system, hereinafter referred to as bit synchronization, is realized by a self-synchronizing system. This may be accomplished by deriving the bit fundamental period from the pulse pattern of information signals by a filter circuit of high selectivity.

If a bit synchronizer Bit SY, a frame synchronizer FrSY and a frame selector Select, for determining the position of the framing signal when the framing is pulled out and controlling the clock circuit and selecting and fixing the clock phase at the proper position with respect to the time slot of the framing signal, on the receiving side of the transmission line of FIG. 1, are all in the normal synchronization state, the received serial multiplex PCM codes are led to a decoder DEC through a branch or coupling circuit Coup of the synchronizing part and are decoded and converted to time division multiplex PAM signals.

The PAM pulse train is branched into channels by channel clocks $ChCL_1$ '——$ChCL_m$' in channel gates $ChG_1$' ——ChG $_m$' and the unnecessary side band is eliminated by low-pass filters $LF_1$'——$LF_m$'. Continuous information current, that is, voice current, is regenerated from the PAM pulses and provided at output terminals $Ch_1$ ——$Ch_m$. On the other hand, the ringing signals are also demodulated by ringing gate Ring G (R) by a process similar to that of demodulation of the channel, although the time constant or the cutoff frequency of the low-pass filter is different, and the output is provided at terminals $R_1$ ——$R_m$. The aforedescribed system is a conventional PCM system and the aforedescribed process is part of the operation of the present invention.

The present invention will now be described in detail. In accordance with the present invention, a frame is constituted by arranging in series $b$ bits of serial channel codes including the signalling bit for a telephone ringing bit by a degree of multiplicity of $m$ during one sampling period $Ts=1/fs$. A time division multiplex series PCM code train is constituted by arranging such frames in succession. The system of the invention is provided, in parallel, with space channels or transmission lines of a number equal to the number of bits, that is, $b$ bits, or one channel of the series PCM codes. The series PCM code train is provided in the $b$ space channels in such manner that the corresponding bits may be synchronized with each other. The corresponding bits of the $b$ time division multiplex serial PCM code trains are converted so that they may be arranged in succession in the 1st to $b$th channels of the space channels.

As a result of the converting operation, pulses of the same time slot are arranged in the $b$ space channels. That is, pulses of the first time slot of the series PCM code train of all the space channels are supplied to the first space channel, pulses of the second time slot are supplied to the second space channel and pulses of the $b$th time slot are supplied to the $b$th space channel. In the system of the present invention, one ringing bit is always included in $b$ time slots of a channel before conversion, so that one space channel comprising only ringing bits can be formed by the converting operation. The ringing signals are interrupted direct current of about scores of cycles, so that if the corresponding ringing codes are supplied to all the channels at a frequency which is greater than a multiple of the frequency of direct current, space is formed in the time slot of the space channel comprising ringing bits and synchronizing signals may be inserted in such space. The insertion of synchronizing signals provides a more stable and certain synchronization signals provides a more stable and certain synchronization than in the conventional or known self-synchronizing systems.

A second system, which is a development of the aforedescribed system of the present invention, utilizes the insertion of two sets of series PCM signals in a time slot of one bit in the form of NRZ codes. This is accomplished by external synchronism at the time of time division multiplex series PCM code transmission twice during a time slot of one bit by the use of the stable synchronizing signals obtained by the aforedescribed system of the present invention. Self-synchronism cannot be realized in NRZ codes, where the duty cycle is 100 percent, but if there is external synchronism, the NRZ codes can be transmitted at a transmission bandwidth which is half that of ordinary codes, where the duty ratio is 50 percent.

Accordingly, an information of two bits can be transmitted in a time slot of one bit. Furthermore, in the third system, the required transmission band can be halved by transmitting one bit in a time slot of one bit by the use of NRZ codes. As hereinbefore described, in the present invention, space is formed in the time slot of the space channel by gathering only the ringing bits and such space is used effectively.

FIG. 2a is a graphical illustration of series PCM code trains before series to parallel conversion. In FIG. 2*a*, $\tau ch$ the time division channel length and $\tau b$ is a time slot of one bit. The pulse length of one bit is $\tau b/2$ . 1, 2, ...$i$... $b$ are numbers of bits, N*pgl* is the first space division channel, N*pgj* is the $j$th space division channel, and C*jm* is the $m$th time division channel of the $j$th space division channel.

FIG. 2*b* is a graphical illustration of series PCM code trains after series-parallel conversion. Codes of the first bits of the channels of FIG. 2*a* are arranged in order in series code train 1 of FIG. 2*b* and codes of the $i$th bits of the channels of FIG. 2*a* are arranged in order in serial code train $i$ of FIG. 2*b*. In FIG. 2*b*, the ringing bit is provided the $b$th bit, and R*jl* is the ringing bit of the first time division channel of the $j$th space division channel. SYF*od* and SYF*ev*. are framing signals and are inserted in the first time slot of one frame and correspond, for example, to 0 and 1.

Codes of the $b$th bits of the channels of FIG. 2*a*, that is, the ringing codes, are arranged in series code train $b$ of FIG. 2*b* . Here, as hereinbefore described, only a small number of time slots are required for the necessary ringing codes in the code train of the ringing codes. Synchronizing signals may thus be inserted in the spare time slots.

FIGS. 2*c* and 2*d* illustrate an embodiment of the synchronizing signals. In FIG. 2*c*,R is the pattern of the necessary ringing codes and SY$b$ is the pattern of the synchronizing signals. In FIG. 2$d$, R and SY$b$ are shown on an expanded scale.

FIG. 2$e$ is a graphical illustration of the combination of PCM code trains and aids in explaining the operation of the second system of the present invention. In FIG. 2$e$, NL'$i$ ($MG_1$) is a PCM code train of zero phase, NL'$i$ ($MG_2$) is a PCM code train OF $\pi$ phase AND NL$i$ is the combination of the code trains NL'$i$ ($MG_1$) and NL'$i$ ($MG_2$).

The operation of the system of the present invention is described with reference to FIGS. 3$a$, and 3$b$. FIG. 3$a$ shows an embodiment of the transmission converting device of the system of the present invention. FIG. 3$a$ also explains receiver conversion since the conversion of received signals may be accomplished by an operation which is the reverse of that of the transmission-converting device. In FIG. 3$a$, each of PG$1$ to PG$b$ is a well-known time division multiplex device which multiplies fundamental PCM code trains of $m$ channels formed by coding voices and forms the code trains shown in FIG. 2$a$. In FIG. 3$b$, the second system further comprises similar time division multiplex devices PG$1$ ($\pi$)......PG$b$ ($\pi$).

In FIG. 3$a$, a clock generator CL GEN is connected in common to the time division multiplex device PG1——PG$b$ and supplies the time division multiplex devices with various required clocks or clock signals CL. In the second system in FIG. 3$b$ $\pi$-phase clocks or clock signals CL. $\pi$ are supplied to the time division multiplex devices PG1 ($\pi$)——PG$b$($\pi$).

PCM codes which are made time division multiplex, as shown in FIG. 2$a$, in the aforedescribed manner, are rearranged, as shown in FIG. 2$b$, by a common parallel reading clock or clock signal CLR from the clock generator CL. GEN in a series-parallel converter S-P CONV (FIG. 3$a$). The converter S-P CONV transmits a code train 1 of FIG. 2$b$ to line $L_1$ in FIG. 3$a$ and similarly transmits code trains 2, $i$ and $b$ of FIG. 2$b$ to lines $L_2$, $L_i$ and $L_{br}$, respectively, of FIG. 3$a$.

Clock generator CL. GEN also generates the clocks or clock signals of ringing sample frequency $fsr$, bit frequency $f_b$ or divided frequency $f_b$ ' which are divided bit frequencies by proper integers, and the framing frequency in addition to the aforementioned parallel reading clock. Framing signals SYF and bit synchronization signals SYBit are inserted by the clocks in the outside of the ringing frame in synchronization gate SYGr, which gate is connected to the line or channel $L_{br}$ comprising only ringing bits and coupling signals. The coupling signals are formed by coupling ringing signals with synchronizing signals. The signals are transmitted to terminal $L_{brs}$.

In the third system of the present invention a pulse length converting circuit PL, which doubles the pulse length, is utilized. Particularly as to the ringing channel, the output $L_b$ of the converting circuit PL is connected to the synchronization gate SYGr.

Various kinds of circuits can be used as the series-parallel converter of FIG. 3a of the present invention. A suitable series-parallel converter may comprise, for example, that shown in FIG. 5. In FIG. 5, C designates time division multiplex devices which are equivalent to PG1, PG2——PG$j$, PG$b$ of FIG. 3$a$. Memo 1——Memo $b$ are memory circuits comprising, for example, delay lines. $G_1$——$G_b$ are reading gates and $DL_{b1}$——$DL_{bb}$ are delay lines.

It is assumed that series PCM code trains are generated in the time division multiplex devices C of FIG. 5. The code trains are stored in the memory circuits Memo 1——Memo $b$ in an A part of the series-parallel converter S-P CONV corresponding to the time division multiplex devices C and are derived at terminals $b_1$——$b_b$ , spaced from each other by $\rho b$ (FIG. 2$a$). The code trains are read by reading gates $G_1$——$G_b$ and parallel PCM code trains may be provided at $b$ parallel channels. If the parallel PCM code trains are supplied to the delay lines $DL_{b1}$——$DL_{bb}$, having terminals $dl$——$dj$——$db$ spaced from each other by $\rho b$ and nonreflection terminated by, for example, Tem, as shown in FIG. 5, $b$ bits of parallel PCM code trains as shown in FIG. 2$b$ may be provided at the output terminals $L_1$ ——$L_b$ of said delay lines.

Incidentally, series PCM code trains may be derived from terminals $L_{a1}$——$L_{ab}$ of the series-parallel converter of FIG. 5. Furthermore, most series PCM coding circuits include memory circuits, so that the A part of the series-parallel converter S-P CONV (FIG. 5) is often included in the time division multiplex devices. In such a case, the system of the present invention may be applied by adding only a B part.

FIG. 3$c$ is a block diagram of a regenerative repeater of the system of the present invention. In FIG. 3$c$, $L_{1in}$, $L_{2in}$.....$L_{bin}$ are input terminals. $L_{1out}$, $L_{2out}$..... $L_{bout}$ are output terminals. Wreg 1, Wreg 2..... Wreg $b$ are wave generators which are similar to each other in structure. SYreg is a bit synchronization wave regenerator for the ringing and synchronizing channels. The bit synchronization waves regenerated by the regenerator SYreg are supplied to the wave regenerators as timing signals and provide regenerative repeating operation in the wave regenerators.

The aforedescribed system of the present invention has the following advantages.

1. The standardized time division series multiplex PCM modulation and demodulation circuit and the waveform regeneration circuit of a regenerating relay may be readily designed with as much facility as circuits of comparatively low multiplexity and of moderate speed. Furthermore, if high multiplexity is desired, such is achieved at channel number $b$ by utilization of such circuitry as a pregroup. There is thus a considerable reduction in cost and enhanced facility in standard mass production.

2. Since a common clock pulse or signal is supplied in common to all the pregroup circuits, the clock generating circuit is utilized for all the circuits, so that operation is economical. The clock generating circuit may be essentially the same as that utilized in a time division series multiplex system.

3. Although the two functions of waveform regeneration and retiming are included in a regenerating relay circuit, since one retiming wave regeneration or bit synchronization circuit is required for the $b$ channel, a remote power supply to an unmanned relay station may be less than that of a simple parallel system of the $b$ series of a series PCM system.

4. In the series-parallel conversion system of the present invention, the waveform regeneration circuit inserted by each pregroup and parallel transmission channel may be identical. Thus, only one spare pregroup is required as a spare unit or circuit for the $b$ pregroup and only one spare unit is required as a spare unit for the waveform regeneration circuit. Furthermore, if the spare unit for the clock generating circuit and the bit synchronization circuit is provided at 1:1, such spare unit may be very highly dependable as well as maintaining its economy of operation.

5. Since transmission is in the form of a time parallel code using $b$ pairs of channels divided by spaces, when a fault occurs in the channel corresponding to the digit indicating binary number and transmission quality is temporarily slightly decreased until the fault is corrected, without the utilization of a spare unit, a transmission system of high dependability is provided by an automatic change of the transmission channel or waveform regeneration circuit of the smallest digit $2^0$to the faulted channel.

6. Since the synchronization signal utilized is stable and reliable, such signal may be an integral number of times the basic bit period. Furthermore, if $b$+1 channels may be provided in a transmission line of especially large channel capacity, a separate synchronization channel may be provided with the ringing channel. However, the advantages of the foregoing paragraph 5 and of the next-succeeding paragraph 7 do not apply to a simple parallel system of a series PCM system. It is therefore evident that only the present invention, which provides the $b$+1 channel, external synchronization and series-parallel conversion, has such advantages.

7. Since only signals of the same channel of the same pregroup are transmitted simultaneously in the $b$ channel, there is no crosstalk between systems compared with the simple parallel transmission of series PCM.

8. In comparison with a self-synchronization system, when the frame synchronization signal may be selected from the changing pulse pattern and is of a type which may be selected from an almost fixed pattern, the frame synchronization system or circuit at the receiver may be simple and compact.

9. As hereinbefore mentioned, a supplementary signal of slow information transmission speed, such as an alarm signal similar to a ringing signal of a spare unit may be added and inserted into a channel synchronized with the ringing circuit.

An additional advantage is that the second system can transmit double informations without widening the frequency band. Furthermore, the frequency band is halved by the third system.

While the invention has been described by means of specific examples and in specific embodiments, we do not wish to be limited thereto, for obvious modifications will occur to those skilled in the art without departing from the spirit and scope of the invention.

We claim:

1. In a time division multiplex system, a control signal transmission system comprising:

a plurality of incoming serial multiplexed pulse code modulation pulse trains including at least one signalling bit per channel;

series to parallel conversion means associated with each pulse train for changing the series bit relationship to a parallel one and for distributing the parallel bits to individual transmission paths of an output group of transmission paths;

parallel bit assembly means connected to a plurality of output groups and having output means with the same number of parallel transmission paths as each output group for interleaving the parallel bits from each output group onto corresponding transmission paths in said output means whereby one of the transmission paths of said output means transmits only signalling bits;

circuit means connected to said parallel bit assembly means for deriving a single series pulse code modulation train exclusively of signalling bits and maintaining in said single series pulse code modulation train the minumum number of signalling bits required for transmitting signalling information in a unit time; and output means connected to said circuit means for replacing the remaining bits of said single series pulse code modulation train with control signals and transmitting the pulse code modulation trains in parallel.

2. In a time division multiplex system as claimed in claim 1, wherein said control signals are synchronizing signals.

3. In a time division multiplex system as claimed in claim 1, wherein said code means provides said series pulse code modulation trains in two groups of parallel pulse code modulation trains to provide twice the multiplexity provided by a single pulse code modulation train in the same transmission frequency band.

4. In a time division multiplex system as claimed in claim 3, wherein each of said bits is in a bit time slot and each parallel pulse code modulation train comprises a single pulse code modulation train provided in full bit time slots.

5. In a time division multiplex system as claimed in claim 3, wherein each of said bits is in a bit time slot and said two groups of parallel pulse code modulation trains are provided in the same bit time slots.